United States Patent [19]

Gaus et al.

[11] Patent Number: 4,629,042
[45] Date of Patent: Dec. 16, 1986

[54] DRIVE ARRANGEMENT FOR A MOTOR VEHICLE

[75] Inventors: Hermann Gaus, Stuttgart; Gunter Jürgens, Waiblingen; Eberhard Frötschner, Gerlingen; Winfried Rüb, Kernen, all of Fed. Rep. of Germany

[73] Assignee: Daimler-Benz Aktiengesellschaft, Stuttgart, Fed. Rep. of Germany

[21] Appl. No.: 712,513

[22] Filed: Mar. 18, 1985

[30] Foreign Application Priority Data

Mar. 16, 1984 [DE] Fed. Rep. of Germany ....... 3409692

[51] Int. Cl.⁴ .............................................. F16H 45/02
[52] U.S. Cl. .................................. 192/3.25; 192/3.31; 192/104 C
[58] Field of Search ..................... 192/3.23, 3.25, 3.26, 192/3.27, 3.31, 3.34, 104 C

[56] References Cited

U.S. PATENT DOCUMENTS

| | | | |
|---|---|---|---|
| 2,320,116 | 5/1943 | Avila | 192/3.26 |
| 2,397,368 | 3/1946 | Pennington | 192/3.27 |
| 2,648,414 | 8/1953 | Maurer | 192/3.27 |
| 2,891,640 | 6/1959 | Binder | 192/3.26 X |
| 3,935,749 | 2/1976 | Groves | 192/104 C X |

FOREIGN PATENT DOCUMENTS

| | | |
|---|---|---|
| 1254027 | 11/1967 | Fed. Rep. of Germany . |
| 2437777 | 2/1976 | Fed. Rep. of Germany . |
| 2549081 | 5/1976 | Fed. Rep. of Germany . |
| 2913694 | 11/1979 | Fed. Rep. of Germany . |
| 3203653 | 9/1982 | Fed. Rep. of Germany . |

Primary Examiner—Rodney H. Bonck
Assistant Examiner—Richard M. Lorence
Attorney, Agent, or Firm—Barnes & Thornburg

[57] ABSTRACT

A drive arrangement is provided for a motor vehicle in which a hydrodynamic torque converter is installed in the transmission between an engine and a handshift gear box. The hydrodynamic torque converter is equipped with a stop clutch which is responsive to the rotational velocity of the torque converter. The stop clutch engages when the engine and the torque converter are stopped. After the engine is started, the stop clutch automatically unlocks the component parts of the torque converter, thereby allowing relative rotational movement of the engine crankshaft and the vehicle gearshaft. This arrangement provides a parking brake effect when the gearbox is shifted into a gear.

28 Claims, 6 Drawing Figures

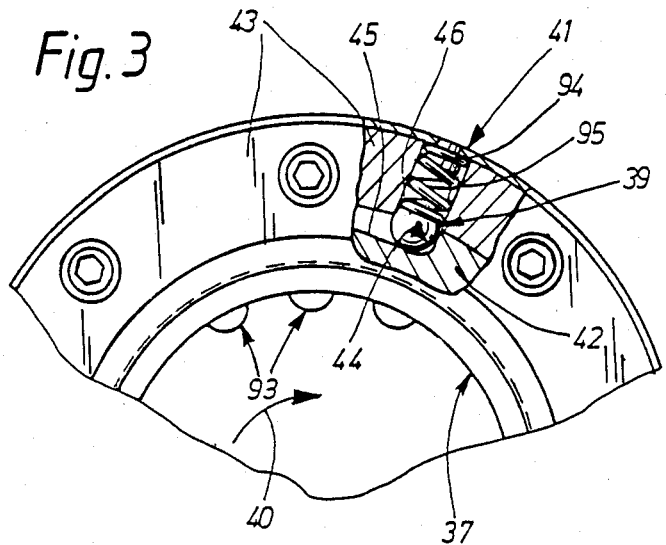
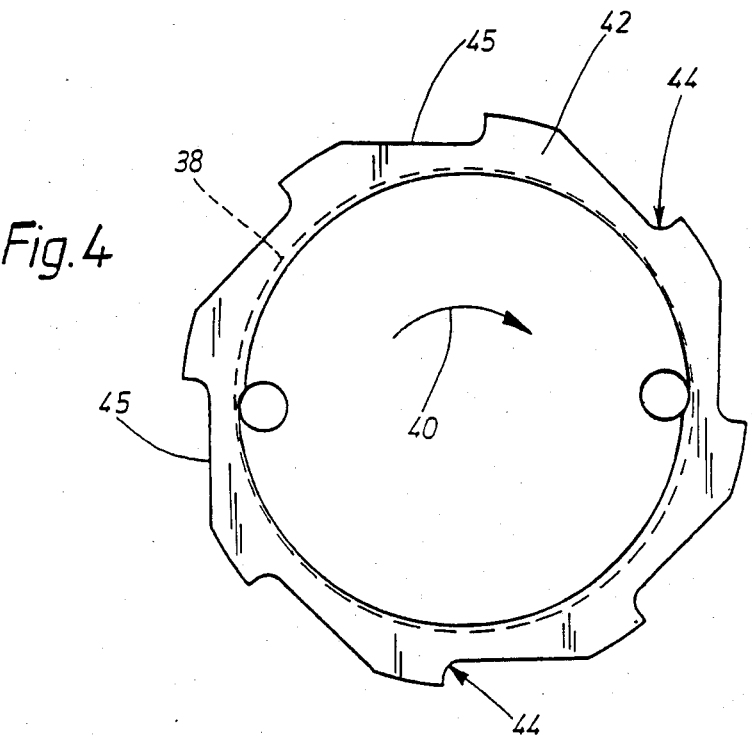

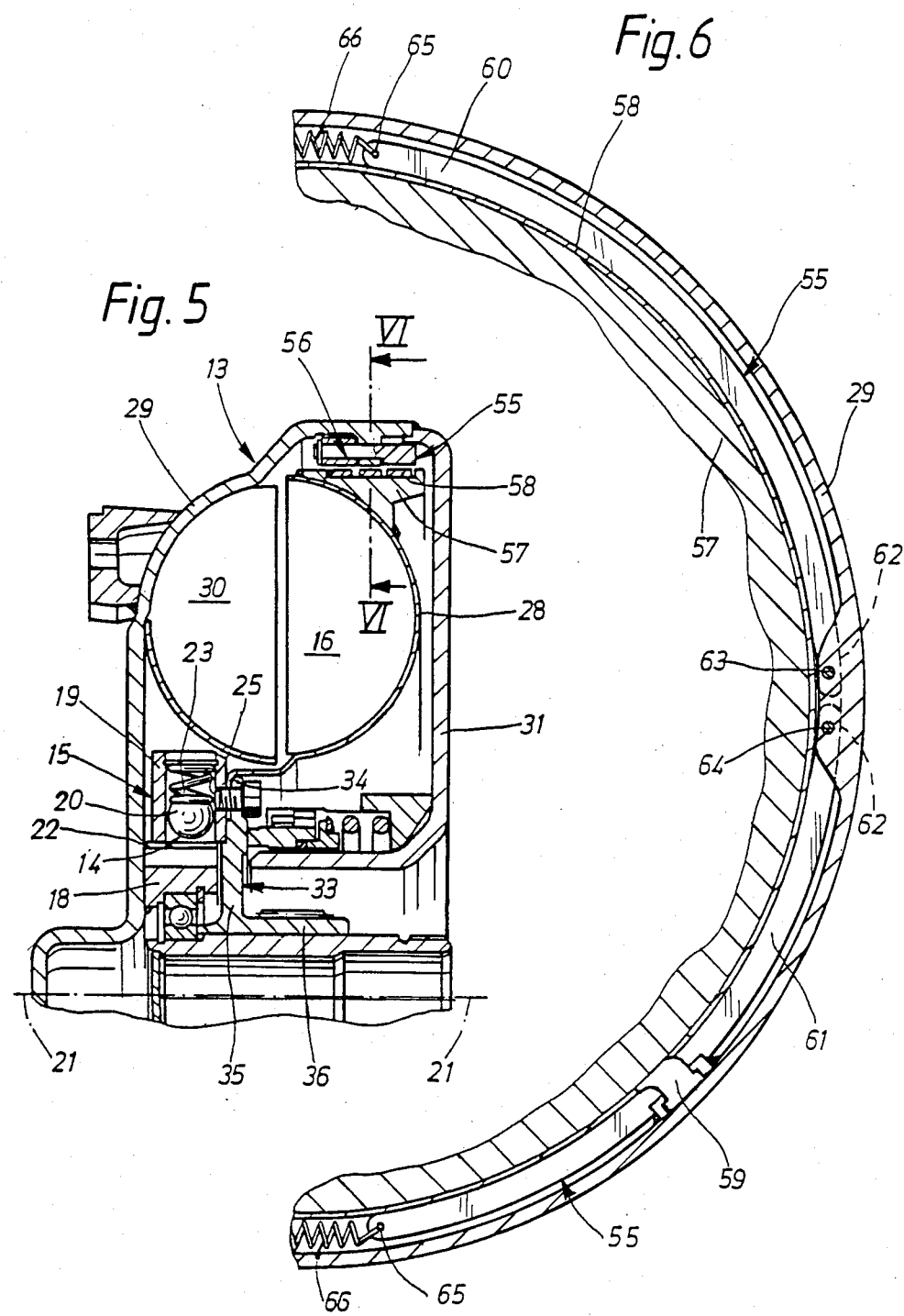

DRIVE ARRANGEMENT FOR A MOTOR VEHICLE

BACKGROUND AND SUMMARY OF THE INVENTION

The invention relates generally to drive arrangements for motor vehicles and more specifically to drive arrangements wherein a hydrodynamic torque converter is employed between an engine drive and a hand-shifted gear box.

In a drive arrangement disclosed in German Auslegeschrift No. 1,254,027, clutch seatings connected nonrotatably to a pump impeller are positioned radially outside of seatings fixed to a turbine wheel. The torque converter is used as a starting clutch and the clutch intermediate elements have to be released immediately on starting. The clutch intermediate elements are spring-loaded and thus, in this arrangement, produce rattling noises when the drive engine is switched off because the pump impeller comes to a standstill before the turbine wheel.

In another drive arrangement disclosed in German Offenlegungsschrift No. 3,203,653, a park position located in tne reverse gear gate is provided for a hand shift lever. A special parking gear wheel of the gearbox is brought into a locking position when the hand shift lever is shifted into the park position thereby locking the gearbox outlet shaft.

A clutch device for connecting the gas turbine of an auxiliary engine of a jet aircraft to an air compressor is disclosed in German Offenlegungsschrift No. 2,549,081. In this device, a centrifugal clutch with cylindrical fly-weights used as clutch intermediate elements can be disengaged even under full load and cannot be reengaged until the shafts concerned are almost at rest. In order to disengage the clutch, tne flyweights emerge from seats located in a clutch ring of the driven clutch half and are radially displaced outwardly into seats formed as corresponding passages in an intermediate ring rotationally connected to the driving clutch half. The flyweights then enter pocket-shaped seats of a selector ring with limited rotational freedom located concentrically outside the intermediate ring when the selector ring is in a corresponding aligned rotational position relative to the intermediate ring.

A friction clutch controlled in a manner depending on rotational speed by fly-weights interacting with engagement and deadpoint springs is described in German Offenlegungsschrift No. 2,437,777. This friction clutch engages at low rotational speeds and disengages at high rotational speeds. In order to achieve a snap effect, the lines of action of the dead-point springs pass through knuckle points when the flyweights are deflected in such a way that a resistant spring force appears before the pivot point is reached and a supporting spring force appears after passing through the pivot point.

Finally, engaging a centrifugal force actuated friction clutch at lower rotational speeds to link a hydrodynamic torque converter and disengaging it at higher rotational speeds is known from German Offenlegungsschrift No. 2,913,694. In order to reduce the occurrence of torsional vibrations when the vehicle is idling, an overrun clutch is connected after a friction clutch in the force path direction. This permits the turbine wheel, which can be brought into drive connection with the gearbox, to overtake the pump impeller connected to the engine drive.

One object of the present invention is to provide a drive arrangement for a motor vehicle having a torque converter whereby a parking brake effect is achievable through shifting of a gearbox into a gear.

Another object is the provision of a parking brake mechanism which engages only when the turbine wheel of the torque converter stops rotating, thereby achieving noiseless engagement.

These and other objects are achieved in accordance with the present invention by the provision of a drive arrangement for a motor vehicle in which a hydrodynamic torque converter is installed in the transmission between an engine and a hand shift gearbox. The torque converter is equipped with a stop clutch which operates in response to the rotational velocity of the torque converter. The clutch engages when the engine and the torque converter are at rest. More specifically, the torque converter comprises a pump impeller and a turbine wheel. Seats are provided in a clutch ring rigidly affixed to the pump impeller of the torque converter and corresponding concentric seats are rigidly affixed to the turbine wheel. The impeller and turbine wheel seats become aligned radially relative to the clutch axis when the engine and torque converter are at rest, thereby allowing flywheel elements within the clutch to operate as clutch intermediate elements which interlock the pump impeller and turbine wheel of the torque converter and thereby prevent relative rotational movement of the gear shaft and the crank shaft. The seats affixed to the turbine wheel are positioned radially outward relative to the clutch ring. This arrangement eliminates the usual rattling noise associated with clutch intermediate elements because the pump impeller clutch ring comes to a stop before the turbine wheel.

Other objects, advantages and novel features of the present invention will become apparent from the following detailed description of the invention when considered in conjunction with the accompanying drawings.

BRIEF DESCRIPTION OF THE DRAWINGS

FIG. 3 shows an enlarged partial sectional of the overrun clutch of FIG. 2 in the direction of the arrow III;

FIG. 4 represents a view of the middle annular body of the overrun clutch of FIG. 2, shown individually;

FIG. 5 represents a partial view corresponding to FIG. 2 of a second embodiment of a drive arrangement in accordance with the present invention; and FIG. 6 represents an enlarged sectional view through the drive arrangement of FIG. 5 on the line VI.

DETAILED DESCRIPTION OF THE DRAWINGS

Figure 1:
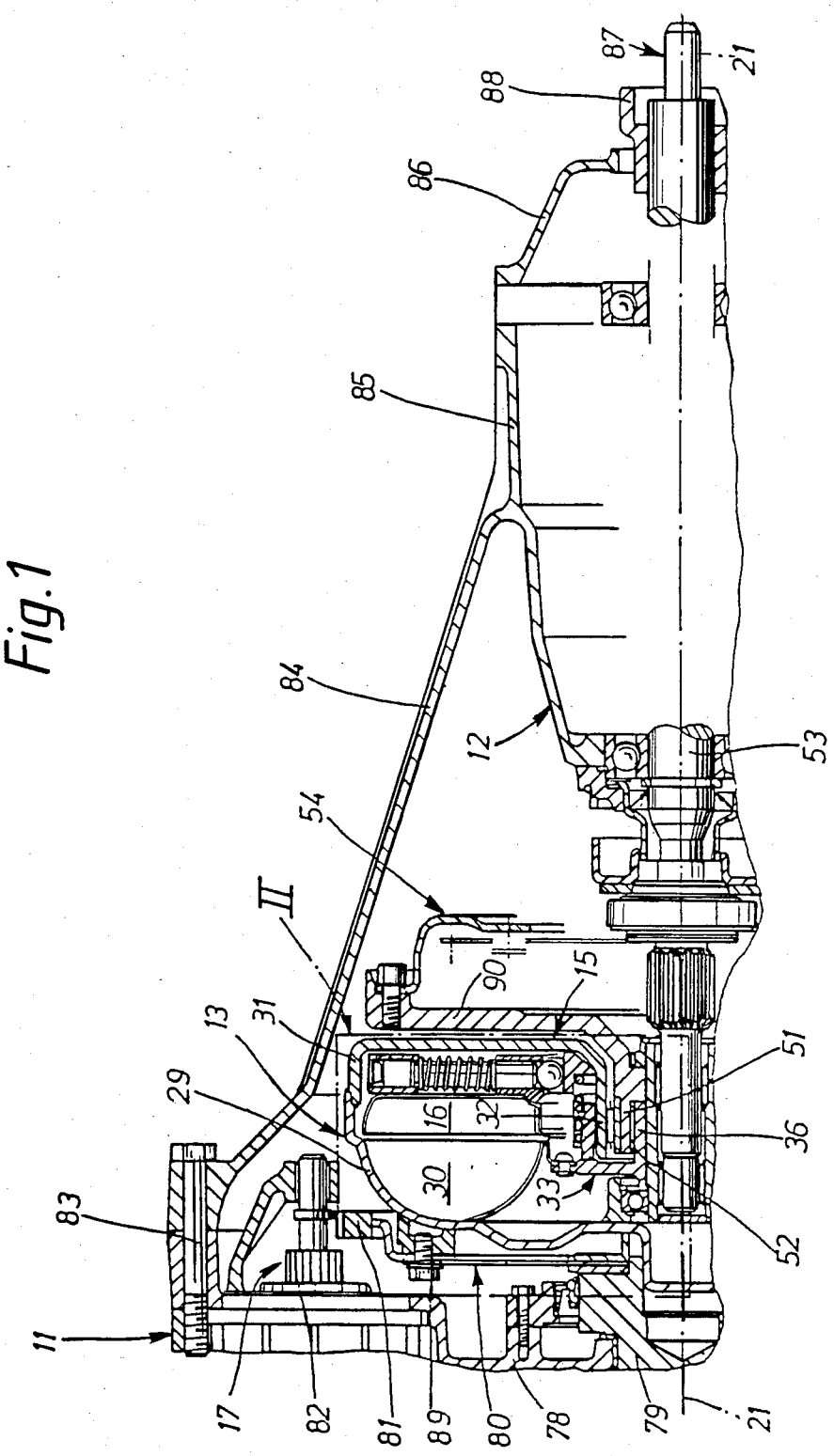
FIG. 1 represents a partial cross sectional view of a drive arrangement of a motor vehicle in accordance with the present invention.

Referring now to FIG. 1, crank shaft 79 is supported in crank casing 78 of drive engine 11. The crank shaft 79 is rigidly connected to both starter gear ring 81 and external shell 29 of pump impeller 30 of hydrodynamic torque converter 13 by means of a drive disk 80 via a screw connection 89. The starter pinion 82 of electrical starter motor 17 is brought into engagement with the starter gear ring 81 in any conventional manner. Clutch casing 84 is flanged onto crank casing 78 by means of screw fastener 83. The clutch casing is integrally designed with a gearbox casing of gearbox 12. In its front region, the gearbox 12 has an input shaft 53 which can be brought into engagement with the drive engine 11 in a conventional manner by means of a pedal actuated separating clutch 54. The clutch halves of torque converter 13 located between the drive engine 11 and the separating clutch 54 can be interlocked by a stop clutch 15. For this purpose, the external shell 29 is rigidly welded to a clutch casing 31, which overlaps the turbine wheel 16 of the torque converter 13 and has an inner casing hub 32 adjacent the clutch axis 21-21. Radially within the casing hub 32 is a turbine wheel hub 36 which is rigidly connected to the turbine wheel 16 by means of an intermediate flange 33. The turbine wheel hub 36 is rigidly connected to clutch hub 51 of clutch drive disk 90 by means of positive drive connection 52. The clutch drive disk 90 is part of the primary side clutch half of the separating clutch 54.

At one end, the gearbox 12 is closed by an end casing cover 86, through which passes the gear output shaft 87. Tnis shaft 87 has a gearbox output flange 88 rigidly connected to it in conventional manner.

Figure 2:
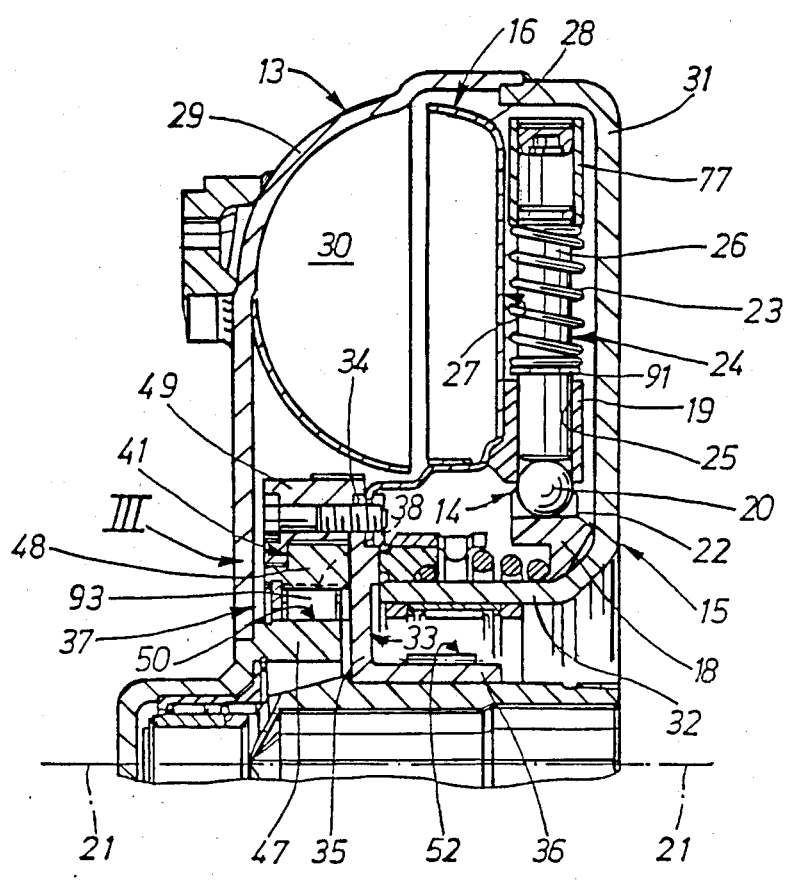
FIG. 2 represents an enlarged partial view from FIG. 1 in accordance with the chain-dotted section II.

As can be seen in FIG. 2, the intermediate flange 33 is unitary with its radially inner region 35 and turbine wheel hub 36, and is rigidly connected to tne turbine wheel 16 at its radially outer region 34. The primary clutch half 18 of the stop clutch 15 is formed by a clutch ring located in tne transition region between the casing hub 32 and the radially extending portion of the clutch casing 31. This clutch ring is rigidly welded to the clutch casing 31. The outer periphery of this clutch ring has axial grooves 22 which are used as positive seats for flyweights 14. The flyweights 14 comprise two parts, one part formed by a ball interacting directly with the seats (or axial grooves) 22 and the other part formed as a cylindrical additional weight 24 which does not take part in torque transmission. The ball 20 and the additional weight 24 are guided in radial guide 25 of a cylindrical seat portion which forms the secondary clutch half 19 of stop clutch 15. The clutch half 19 and cylinder 77 aligned with clutch half 19 are located, in each case, in an indentation 27 of outer shell 28 of the turbine wheel 16 and are rigidly connected to the outer shell 28. The additional weight 24, in the form of cylinder 26, has an annular stop washer 91 in its central region. One end of a concentrically located engagement spring 23 is supported on this washer and the other end of the engagement spring 23 is supported in the cylinder 77. The end of cylindrical weight 24 opposite the flyweight ball 20 is guided in a radially displaceable manner relative to the clutch axis 21-21 in tne cylinder 77.

When the drive engine 11 and the turbine wheel 16 are at rest, the balls 20 are held by engagement springs 23 in the engagement position shown. In this way, the crank shaft 79 is positively connected to the clutch drive disk 90 due to the locking of the torque converter 13 by the stop clutch 15. In this way, the gearbox output shaft 87 can be positively connected to crank shaft 79 by selecting a gear with the hand shift lever.

When starting the drive engine 11, the balls 20 with the additional weights 24 are held in the engagement position by the engagement springs 23 as long as the rotational speed of the crank shaft is not greater than the rotational speed of the starter motor 17. Shortly before reaching the idling rotational speed of the drive engine 11, the biasing force of the engagement springs 23 is overcome thereby allowing the flyweight balls 20 to enter completely into the radial guides 25 on the turbine wheel 16.

An overrun clutch 37 is effectively connected in parallel with the stop clutch 15. For this purpose, the axial annular space located inside the pump impeller 30 between the external shell 29 of the pump impeller and the intermediate flange 33 contains three concentric annular bodies 47, 48 and 49. The first flange 47 is rigidly connected to the external shell 29 and the last flange 49 is rigidly connected to the intermediate flange 33. The overrun clutch 37 operates in a conventional manner with grip rollers 93, which interact with inner face 50 on inner annular body 47 and with gripping surfaces 38 on middle annular body 48.

The middle annular body 48 is connected by a second stop clutch 41 to the outer annular body 49 shown in more detail in FIGS. 3 and 4. These figures show neighbouring annular regions designed as clutch halves 42 and 43, between which fly-weights 39 in the form of balls 46 act. The balls 46 fit into radial guides 95 of the annular body 49 and are supported by the engagement springs 94 when under the influence of the centrifugal force. In order to provide for positive engagement of the balls 46, the clutch half 42 has corresponding seatings 44 on the outer periphery of the annular body 48. These seatings are bounded by inclined surfaces 45 located rearward relative to the rotational drive direction 40. The inclined surfaces 45 allow a release of the stop clutch 41 if the overrun clutch 37 and the stop clutch 15 have engaged after the drive engine 11 has been switched off and the torque converter 13 is to take up its vibration-damping function after a restart.

When the drive engine 11 and the turbine wheel 16 are both at rest, the flyweight balls 20 are forced into the axial grooves 22 by the engagement springs 23 via the weights 26. After the drive engine 11 has started, the biasing force of tne engagement springs 23 is overcome by the centrifugal force transmitted through the flyweight balls 20 in conjunction with the additional weights 24 shortly before the idling rotational speed is reached. At this point in time, the flyweight balls 20 enter their corresponding seats 25 on the turbine wheel 16 and the torque converter 13 unlocks and performs its function. After tne drive engine 11 is switched off, the pump impeller 30 comes to a rest first so that the stop clutch 41 is still free because of the continued rotation of the turbine wheel 16. Only when the rotational speed of the turbine wheel 16 also approaches zero does the stop clutch 41 engage so that the overrun clutch 37 is brought into effect with the result that the turbine wheel 16 is directly braked to lock relative to the pump impeller. Only under this condition, when both rotors of the torque converter are at rest, can the stop clutch 15 also engage.

The embodiment of FIG. 5 differs from that of FIGS. 2 to 4 in that a friction brake 56 is used for braking the turbine wheel 16 relative to the pump impeller 30 instead of an overrun clutch. Additionally, the stop clutch 15 for locking the torque converter is spatially located in the position of the overrun clutch of FIG. 2.

Another different feature in the embodiment of FIG. 5 may be seen in that the flyweight balls 20 are directly supported on the engagement springs 23 with additional weights being omitted. Otherwise, the embodiment of FIG. 5 is included in the same manner in the drive arrangement as has already been described using FIG.

1. An inner clutch ring is located in a fixed position relative to the inner wall of the casing shell 29 of the pump impeller 30, concentric with the clutch axis 21-21 and forming the primary clutch half 18 of the stop clutch 15. The clutch ring 18 again has axial grooves 22 as seats for the balls 20. The balls 20 are accepted in radial guides 25 of a cylindrical seat which forms the secondary clutch half 19 of the stop clutch 15. The clutch half 19, like the turbine wheel 16, is rigidly connected to the outer flange region 34 of the intermediate flange 33. In the vicinity of its maximum diameter, the outer shell 28 of the turbine wheel 16 carries a brake drum 57 rigidly connected therewith. A brake band 58 is wrapped twice around the brake drum 57. As can be seen in FIG. 6, the brake band 58 is actuated by flyweight bodies in the form of pivoting levers 60 and 61 which are pivotably linked at their adjacent ends 62 on linkage pins 63 and 64 of the outer shell 29 of the pump impeller 30. The opposite lever ends 65 of each of two pivoting levers 60 and 61 are connected together by tension spring 66. Whereas one of the brake band ends is connected rigidly to the pump shell 29 at 59, the other end of the brake band lies loosely on the brake drum 57. This other end is pressed against the break drum, in a spring-biased manner, by the pivoting levers 60 and 61 acting as fly-weight body 55 when the pump impeller rotational speed approaches zero. When the turbine wheel 16 is stopped, the flyweight balls 20 can also enter their seatings 22 under the influence of the engagement springs 23. Otherwise, reference should be made to the description of FIG. 1.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

We claim:

1. A drive arrangement for a motor vehicle having a hydrodynamic torque converter installed in a torque transmission path between a drive engine and a hand shift gearbox, said torque converter having a pump impeller and a turbine wheel arranged for relative rotation around a common axis and stop clutch means operating as a function of a rotational speed of said pump impeller and said turbine wheel for preventing relative rotation of said pump impeller and said turbine wheel, said stop clutch means comprising:
   first seating means attached to said turbine wheel,
   second seating means attached to said pump impeller, said second seating means being radially disposed between said common axis and said first seating means, and
   flyweight means interlocking said first and second seating means when said turbine wheel and said pump impeller are at rest, said flyweight means moving radially outward into said first seating means for unlocking said first and second seating means when said rotational speed reaches a preselected value.

2. A drive arrangement according to claim 1, wherein said stop clutch means prevents relative rotation of said pump impeller and said turbine wheel in both rotational directions.

3. A drive arrangement according to claim 1, wherein said drive engine is started by a starter motor having a first rotational velocity, said drive engine has an idling rotational velocity, and said flyweight disengages said second seating means when said stop clutch has a rotational velocity at least equal to said first rotational velocity but less than said idling rotational velocity.

4. A drive arrangement according to claim 1, wherein said drive engine has an idling rotational velocity and said flyweight engages said second seating means when said turbine wheel means has a rotational velocity less than said idling rotational velocity.

5. A drive arrangement according to claim 1, wherein said flyweight means engages said second seating means only when said torque converter is in a low slip condition.

6. A drive arrangement according to claim 1, wherein said flyweight means comprises a ball.

7. A drive arrangement according to claim 1, wherein said second seating means contains an axial groove parallel to said common axis for seating said flyweight means.

8. A drive arrangement according to claim 1, wherein said flyweight means is spring-biased toward said second seating means by spring means positioned in said first seating means.

9. A drive arrangement according to claim 8, wherein additional weight means are disposed between said spring means and said flyweight means.

10. A drive arrangement according to claim 9, wherein said additional weight means comprise cylindrical weight means.

11. A drive arrangement according to claim 9, wherein said additional weight means are disposed in radial guide means on said turbine wheel.

12. A drive arrangement according to claim 1, wherein said torque converter includes overrun clutch means for preventing said turbine wheel from attaining a first rotational velocity greater than a second rotational velocity attained by said pump impeller means.

13. A drive arrangement according to claim 12, wherein said overrun clutch means comprises second stop clutch means, said second stop clutch means engageable with said turbine wheel when said turbine wheel stops rotating.

14. A drive arrangement according to claim 13, wherein said second stop clutch comprises first and second relatively rotatable clutch halves, said first clutch half containing radially displaceable flyweights for engaging said second clutch half, thereby preventing relative rotation of said clutch halves.

15. A drive arrangement according to claim 14, wherein said flyweights engage said second clutch half when there is relative rotation of said second clutch half relative to said first clutch half in a drive rotational direction.

16. A drive arrangement according to claim 14, wherein said flyweight means comprise balls.

17. A drive arrangement according to claim 13, wherein said overrun clutch means is radially disposed within said pump rmpeller.

18. A drive arrangement according to claim 14, wherein said pump impeller means has a first annular body concentric with said common axis, said turbine wheel has a second annular body concentric with said first annular body and positioned radially outward relative to said first annular body, said torque converter having a third annular body concentric with said first and second annular bodies, and positioned between the said first and second annular bodies, said first annular body providing an inner face for said overrun clutch, said third annular body providing an outer face for said overrun clutch and comprising said second clutch half of said second stop clutch, said second annular body comprising said first clutch half of said second stop clutch.

19. A drive arrangement according to claim 1, further comprising clutch drive means selectively engageable with said turbine wheel, said clutch drive means also selectively engageable with an input shaft of a gearbox.

20. A drive arrangement according to claim 1, further comprising friction brake means attached to said pump impeller and said turbine wheel for reducing the relative rotational velocity of said impeller relative to said turbine wheel, said friction brake means having secondary flyweight means.

21. A drive arrangement according to claim 20, wherein said friction brake means secondary flyweight means are spring biased in a braking position when said relative rotational velocity approaches zero.

22. A drive arrangement according to claim 21, wherein brake drum means are rotatably connected to said turbine wheel and brake band means are wrapped twice around said brake drum, one end of said brake band means being rigidly connected to said pump impeller, and another end of said brake band means lying freely on said brake drum means, said brake band means being engageable with said secondary flyweight means.

23. A drive arrangement according to claim 20, wherein said secondary flyweights comprise a pair of pivoting lever means, said lever means being connected at their fixed ends to link means mounted for relative rotation with said pump impeller, said link means being connected to each other at their opposite ends by tension spring means.

24. A drive arrangement for a motor vehicle having a hydrodynamic torque converter installed in a torque transmission path between a drive engine and a hand shift gearbox, said torque converter having a pump impeller and a turbine wheel arranged for relative rotation around a common axis and stop clutch means operating as a function of a rotational speed of said pump impeller and said turbine wheel for preventing relative rotation of said pump impeller and said turbine wheel, said stop clutch means comprising:
  first seating means attached to said turbine wheel,
  second seating means attached to said pump impeller,
  flyweight means disposed for radial movement in said first seating means upon rotation of said turbine wheel and for engaging said second seating means when said turbine wheel stops rotating,
  said second seating means being radially disposed between said common axis and said first seating means, said torque converter including overrun clutch means for preventing said turbine wheel from attaining a first rotational velocity greater than a second rotational velocity attained by said pump impeller means, said overrun clutch means comprising second stop clutch means, said second stop clutch means being engageable with said turbine wheel when said turbine wheel stops rotating, said second stop clutch comprising first and second relatively rotatable clutch halves, said first clutch half containing radially displaceable flyweights for engaging said second clutch half, thereby preventing relative rotation of said clutch halves, said pump impeller means having a first annular body concentric with said common axis, said turbine wheel having a second annular body concentric with said first annular body and positioned radially outward relative to said first annular body, said torque converter having a third annular body concentric with said first and second annular bodies, and positioned between the said first and second annular bodies, said first annular body providing an inner face for said overrun clutch, said third annular body providing an outer face for said overrun clutch and comprising said second clutch half of said second stop clutch, said second annular body comprising said first clutch half of said second stop clutch.

25. A drive arrangement for a motor vehicle having a hydrodynamic torque converter installed in a torque transmission path between a drive engine and a hand shift gearbox, said torque converter having a pump impeller and a turbine wheel arranged for relative rotation around a common axis and stop clutch means operating as a function of a rotational speed of said pump impeller and said turbine wheel for preventing relative rotation of said pump impeller and said turbine wheel, said stop clutch means comprising:
  first seating means attached to said turbine wheel,
  second seating means attached to said pump impeller,
  flyweight means disposed for radial movement in said first seating means upon rotation of said turbine wheel and for engaging said second seating means when said turbine wheel stops rotating, said second seating means being radially disposed between said common axis and said first seating means, and
  friction brake means attached to said pump impeller and said turbine wheel for reducing the relative rotational velocity of said impeller relative to said turbine wheel, said friction brake means having secondary flyweight means.

26. A drive arrangement according to claim 25, wherein said friction brake means secondary flyweight means are spring biased in a braking position when said relative rotational velocity approaches zero.

27. A drive arrangement according to claim 26, wherein brake drum means are rotatably connected to said turbine wheel and brake band means are wrapped twice around said brake drum, one end of said brake band means being rigidly connected to said pump impeller, and another end of said brake band means lying freely on said brake drum means, said brake band means being engageable with said secondary flyweight means.

28. A drive arrangement according to claim 25, wherein said secondary flyweights comprises a pair of pivoting lever means, said lever means being connected at their fixed ends to link means mounted for relative rotation with said pump impeller, said link means being connected to each other at their opposite ends by tension spring means.

* * * * *